United States Patent
Majumdar et al.

(10) Patent No.: US 11,926,783 B2
(45) Date of Patent: Mar. 12, 2024

(54) ELECTROCHEMICAL REDOX REFRIGERATION

(71) Applicant: The Board of Trustees of the Leland Stanford Junior University, Stanford, CA (US)

(72) Inventors: Arunava Majumdar, Menlo Park, CA (US); Ian S. McKay, Seattle, WA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 232 days.

(21) Appl. No.: 16/847,289

(22) Filed: Apr. 13, 2020

(65) Prior Publication Data
US 2020/0325379 A1 Oct. 15, 2020

Related U.S. Application Data

(60) Provisional application No. 62/833,098, filed on Apr. 12, 2019.

(51) Int. Cl.
*C09K 5/16* (2006.01)
*F25B 21/00* (2006.01)
*H01M 8/18* (2006.01)

(52) U.S. Cl.
CPC .............. *C09K 5/16* (2013.01); *F25B 21/00* (2013.01); *H01M 8/188* (2013.01)

(58) Field of Classification Search
CPC .......... C09K 5/16; H01M 8/188; F25B 21/00; F25B 2321/02; F25D 5/00; F25D 5/02
(Continued)

(56) References Cited

U.S. PATENT DOCUMENTS 3,478,528 A * 11/1969 Roland ................... F25B 23/00
62/3.1
9,559,388 B2 * 1/2017 Lee .......................... H01M 4/48
(Continued)

FOREIGN PATENT DOCUMENTS

SU          418685 A1 *  3/1974
SU         1267129 A1 * 10/1986
WO   WO-2015164907 A1 * 11/2015 ............. H01L 27/16

OTHER PUBLICATIONS

McKay et al. ("Electrochemical Refrigeration and Energy Harvesting with the Vanadium-Bromide Couples," ECS Meeting Abstracts, vol. MA2016-02, A01-Batteries and Energy Technology Joint General Session, 2016) (Year: 2016).*
(Continued)

*Primary Examiner* — Matthew R Diaz
(74) *Attorney, Agent, or Firm* — LUMEN PATENT FIRM

(57) ABSTRACT

A method of electrochemical redox refrigeration includes inducing a flow of an electrochemical refrigerant that is in contact with a first electrode to a second electrode; applying an electrical potential difference between the first electrode and the second electrode, wherein the electrochemical refrigerant is oxidized at one of the first electrode and second electrode and reduced at another of the first electrode and second electrode; wherein the first electrode is at least partially thermally isolated from Joule heating in the electrochemical refrigerant and from activation losses in the second electrode by an action of the flow of the electrochemical refrigerant.

10 Claims, 9 Drawing Sheets

(58) Field of Classification Search
USPC ................................................ 62/3.1, 3.2, 4
See application file for complete search history.

(56) References Cited

U.S. PATENT DOCUMENTS

| | | | | |
|---|---|---|---|---|
| 11,015,875 | B2* | 5/2021 | Benedict | ................ F25B 15/00 |
| 2005/0236028 | A1* | 10/2005 | Strnad | ................... F25B 21/02 |
| | | | | 62/3.2 |
| 2017/0288253 | A1* | 10/2017 | Chueh | .................. H01M 8/182 |

OTHER PUBLICATIONS

McKay et al. Electrochemical Redox Refrigeration. Scientific Reports vol. 9, Article No. 13945 (2019).
Lee, S. W. et al. An electrochemical system for efficiently harvesting low-grade heat energy. Nat. Commun. 5, 3942-3942 (2014).
Poletayev, A. D., McKay, I. S., Chueh, W. C. & Majumdar, A. Continuous electrochemical heat engines. Energy Environ. Sci. 11, 2964-2971 (2018).
Cole, T. Thermoelectric energy conversion with solid electrolytes. Science 221, 915-920 (1983).
Bahar, B. et al. An overview of advancements in electrochemical compressor driven heat pump systems. 10 (2017).
R.S. Yeo, D.T. Chin, A hydrogen-bromine cell for energy storage applications, J. Electrochem. Soc. 127 (1980) 549-555.
Gerlach, D. W. & Newell, T. a. An Investigation of Electrochemical Methods for Refrigeration. ACRC ACRC Technical Report 234 (2004).
Hu, R. et al. Harvesting waste thermal energy using a carbon-nanotube-based thermo-electrochemical cell. Nano Lett. 10, 838-846 (2010).

* cited by examiner

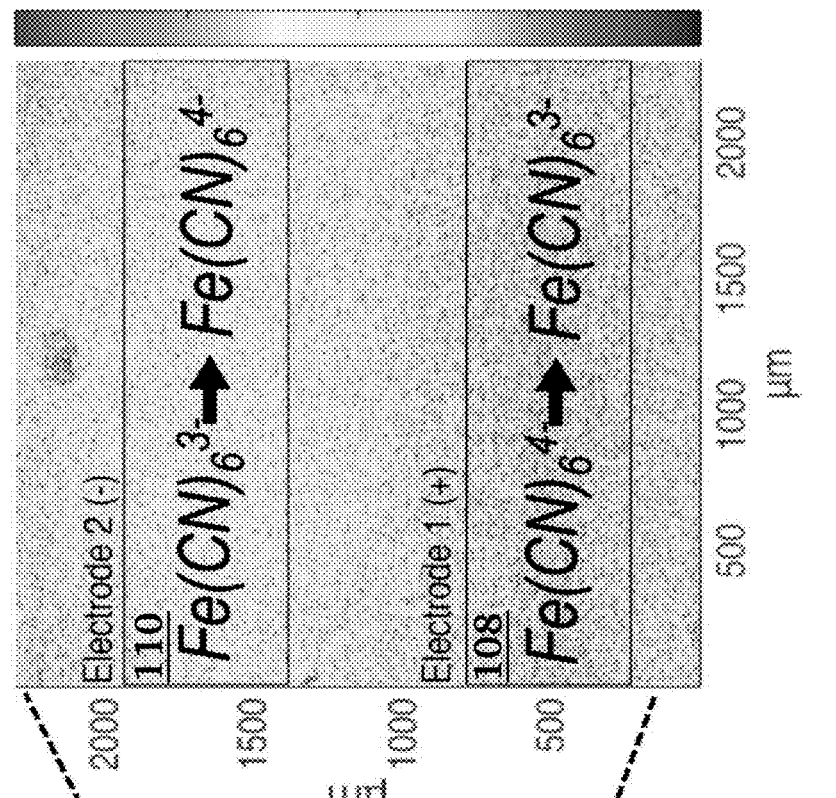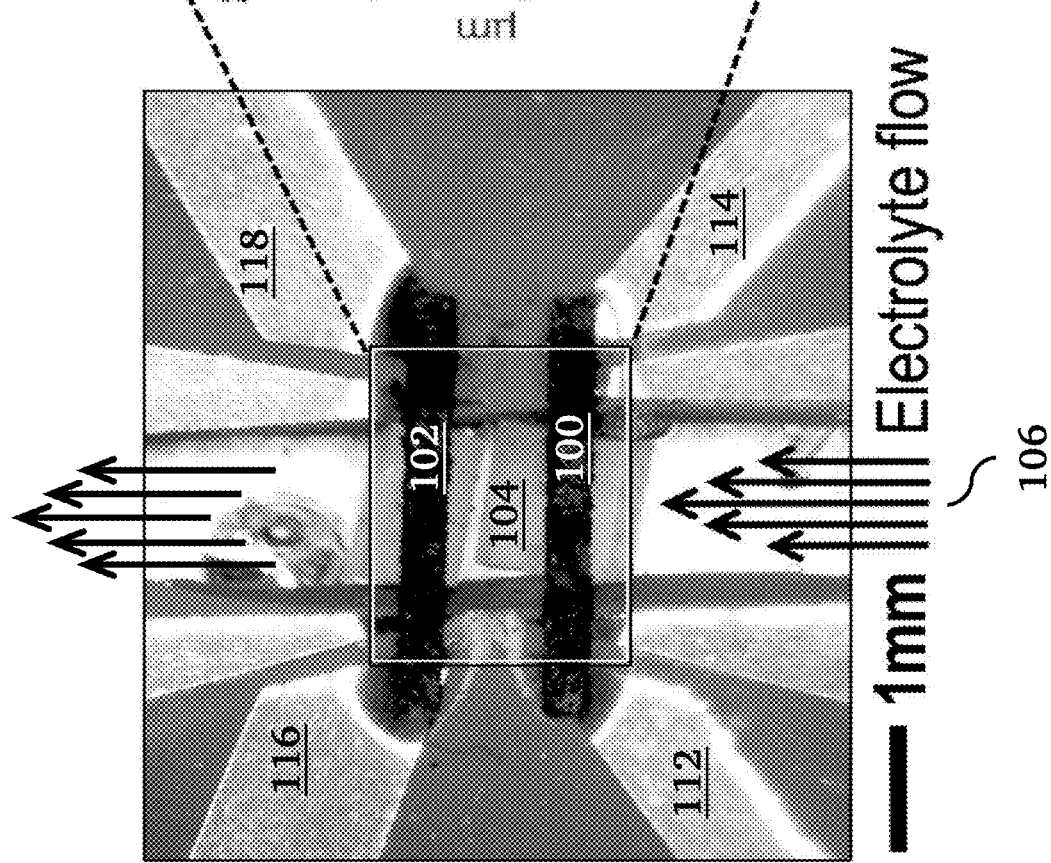

Fig. 9
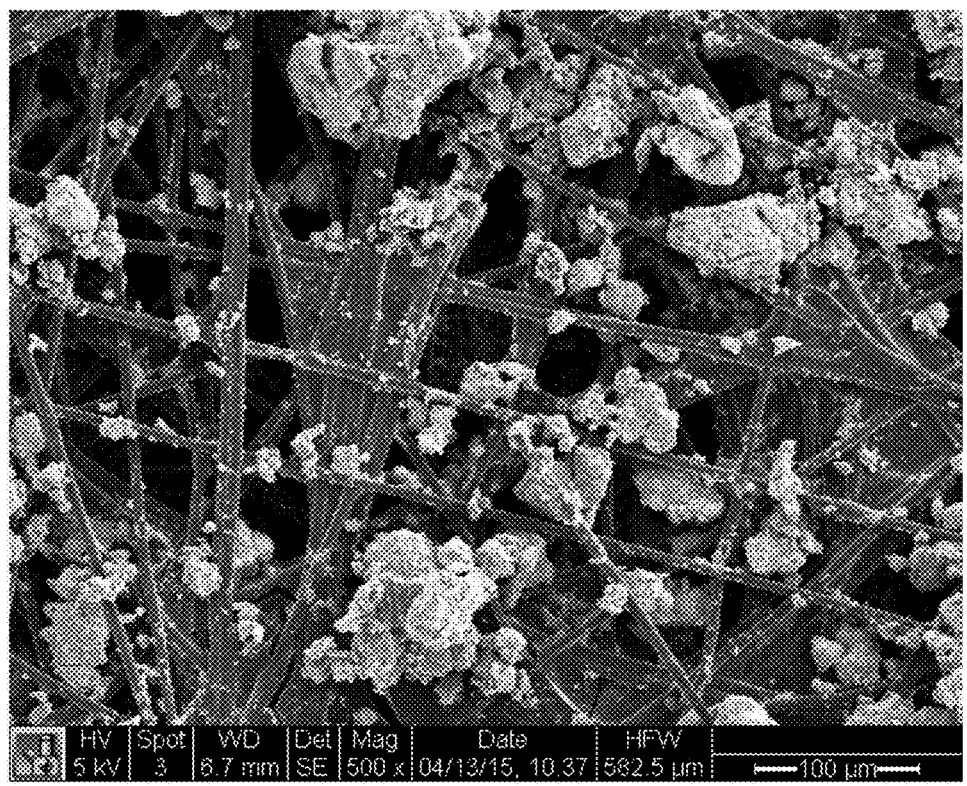
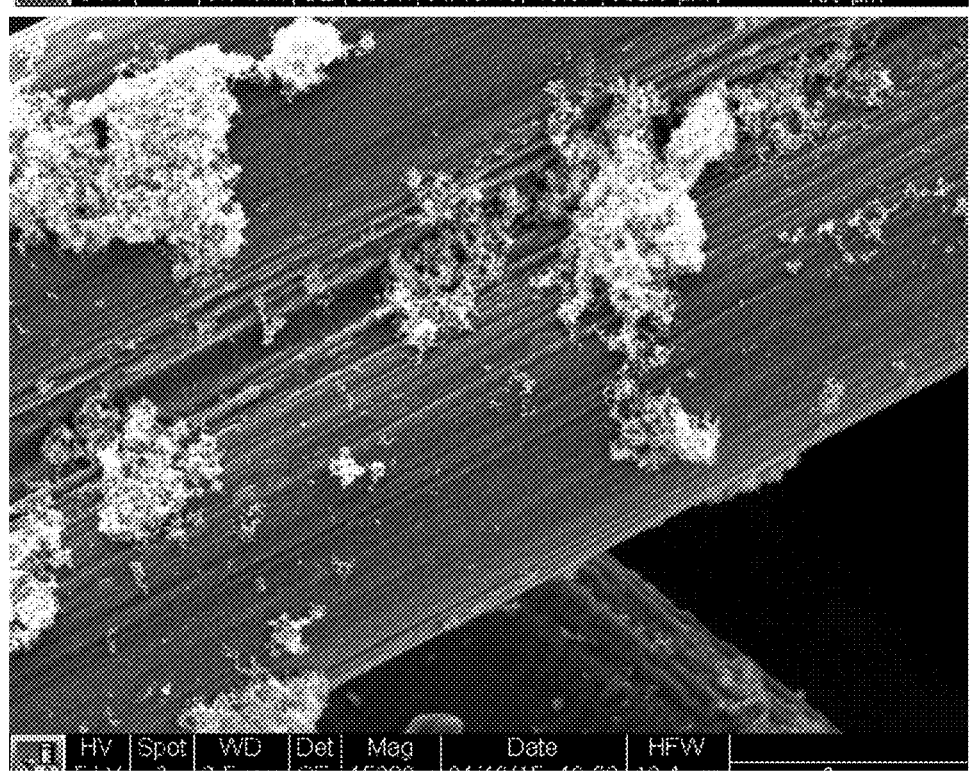

ELECTROCHEMICAL REDOX REFRIGERATION

CROSS-REFERENCE TO RELATED APPLICATIONS

This application claims priority from U.S. Provisional Patent Application 62/833,098 filed Apr. 12, 2019, which is incorporated herein by reference.

FIELD OF THE INVENTION

The present invention relates generally to refrigeration devices and methods. More specifically, it relates to techniques for electrochemical oxidation-reduction refrigeration.

BACKGROUND OF THE INVENTION

Air conditioning and refrigeration consume roughly 20% of all electrical power in US residences and 25% in commercial buildings[1]. By 2050, the world population will grow by an additional 2.5 B, mostly in urban areas hot and humid urban areas that will need cooling[2]. This demand creates a need for more energy efficient refrigeration. Moreover, common refrigerants, such as hydrofluorocarbons (HFCs) and hydrochloro-fluorocarbons (HCFCs), have specific global warming potentials about 2000 times that of $CO_2$. It is predicted that the impact of global warming owing to refrigerant leakage alone could grow to be about 10-40% that of all emitted $CO_2$[3]. It is thus imperative that HFCs and HCFCs be phased out in favor of more environmentally friendly refrigerants[4].

A key parameter in the thermodynamics of any cooling cycle is the entropy change, $\Delta S$, of the energy carrier. For HFCs, $\Delta S$ is typically ~1 kJ/kg-K (or ~1 mV/K per carrier)[5]. While the $\Delta S$ associated with thermoelectric, electrocaloric, magnetocaloric, thermoacoustic, thermoelastic, absorption and other phase transitions have been studied intensively for cooling purposes[6,7], no alternative approach has yet provided the reversible and controllable $\Delta S$ required to be a viable at-scale alternative to vapor compression refrigeration.

One under-studied source of $\Delta S$ can be found in electrochemical redox reactions. Redox processes are controllable, reversible, can manifest large entropy changes per unit charge (as high as 2 mV/K over a broad temperature range), and have been harnessed in a wide variety of practical and profitable applications[8]. In thermogalvanic systems, the electrochemical analogues of solid-state thermoelectric devices, entropy changes inherent in redox reactions are used to couple a flow of ions to a flow of heat for energy harvesting purposes[9]. Recent advances in this concept include both thermally regenerative and continuous electrochemical heat engines, in which forced convection of redox-active fluids allows for decoupling of ionic and thermal transport lengths that may lead to higher efficiencies than are achievable by solid-state thermoelectrics[10,11]. In addition to leveraging the fundamental reaction entropy, thermo-electrochemical systems that leverage the interaction of electrochemical driving forces and other phase transitions have also been deployed successfully[12,13]. However, little progress has been made on electrochemical refrigeration systems. Although the presence of an electrochemical cooling effect is recognized[14] and double redox junction refrigeration systems have been considered[15], no one has managed yet to realize this approach in a practical implementation.

BRIEF SUMMARY OF THE INVENTION

A simple single junction redox refrigerator has a fundamental advantage over its solid-state equivalent. Since thermal and electrical conduction are inextricably linked in solid materials, Joule heating from the bulk element necessarily diffuses towards the cooling junction. This creates an upper limit on the cooling power of Peltier coolers[16]. By contrast, if a fluid is used instead, the Joule heating can be transported away from the cold junction via advection. In other words, a fluid thermoelectric can actively advect joule-heated electrolyte away from the cooling junction with no penalty to the entropy transport, potentially unlocking higher maximum power. Hence, a fluid-based redox refrigerator can operate without this upper bound in performance.

In this description, we disclose a single junction redox refrigerator. In one implementation, the refrigerator is based on the $Fe(CN)_6^{3-/4-}$ redox couple, which has been shown previously to possesses the requisite low activation energy, high entropy change, and high overall reversibility for effectively coupling thermal and electrical energy flows[17].

This single junction redox refrigerator uses the conformational entropy change of an electrochemical redox reaction to produce a refrigeration effect. This device is similar to a liquid version of a Peltier cooler, but with two distinct advantages: 1) the entropy change per carrier of the electrochemical refrigerant is more than five times larger than state-of-the-art thermoelectric materials and 2) the liquid element can be convected continuously away from the cooling junction, so that joule heating in the bulk element does not diminish the delivered cooling effect. Embodiments of the invention provide a higher Seebeck coefficient and solve a problem with Joule heating propagating towards the cooling junction.

Significantly, the electrolyte flow from the cooling electrode towards the heating electrodes provides a continuous refrigeration effect, which is not otherwise possible with a single junction. The use of electrolyte flow provides a continuous refrigeration effect. Using a fluid, the Joule heating can be transported away from the cold junction via advection. In other words, a fluid thermoelectric can actively advect joule-heated electrolyte away from the cooling junction with no penalty to the entropy transport, unlocking higher maximum power. Hence, this fluid-based redox refrigerator can operate without this upper bound in performance.

Applications of this device include air conditioning, refrigeration, microprocessor and battery cooling.

In one aspect, the invention provides a method of electrochemical redox refrigeration comprising inducing a flow of an electrochemical refrigerant that is in contact with a first electrode to a second electrode; applying an electrical potential difference between the first electrode and the second electrode, wherein the electrochemical refrigerant is oxidized at one of the first electrode and second electrode and reduced at another of the first electrode and second electrode; wherein the first electrode is at least partially thermally isolated from Joule heating in the electrochemical refrigerant and from activation losses in the second electrode by an action of the flow of the electrochemical refrigerant.

In one implementation, the first electrode is a cooling electrode and the second electrode is a heating electrode.

The electrochemical refrigerant may flow from the first electrode toward the second electrode, or it may flow in a transverse direction between the first electrode and the second electrode.

In one implementation, the electrochemical refrigerant is reduced at the first electrode to $Fe(CN)_6^{4-}$ and is oxidized at the second electrode to $Fe(CN)_6^{3-}$.

Preferably, inducing the flow of the electrochemical refrigerant comprises inducing a continuous flow.

The electrochemical refrigerant preferably has a figure of merit $$Q_{g/b} = \frac{\Delta S\left(\frac{J}{\text{mol } K}\right) T(K)}{E_a\left(\frac{J}{\text{mol}}\right)}$$

whose value is greater than 1, where T represents temperature, $\Delta S$ represents the absolute value of the standard entropy of reduction of the refrigerant, and $E_a$ represents activation barrier for oxidation or reduction of the refrigerant.

In one implementation, the electrochemical refrigerant is directed through multiple successive electrochemical refrigeration cells to produce a larger net temperature depression than in a single cell.

In one implementation, the electrochemical refrigerant is used for electrical energy storage and electrochemical refrigeration. For example, the method may include inducing the flow of two electrochemical refrigerants, driving two redox reactions in a negative entropy direction at a pair of cooling electrodes to either store or release stored energy and produce a redox cooling effect, and driving the two redox reactions in a positive entropy direction to either store or release stored energy and produce a redox heating effect.

BRIEF DESCRIPTION OF THE SEVERAL VIEWS OF THE DRAWINGS

FIG. 2A is an optical view of a redox refrigerator device showing the electrodes and electrolyte flow channel.

FIG. 2B is an infrared view of a redox refrigerator device showing the electrodes and electrolyte flow channel.

FIG. 9 shows SEM images of the porous cooling electrodes as prepared.

DETAILED DESCRIPTION OF THE INVENTION

Figure 1B:
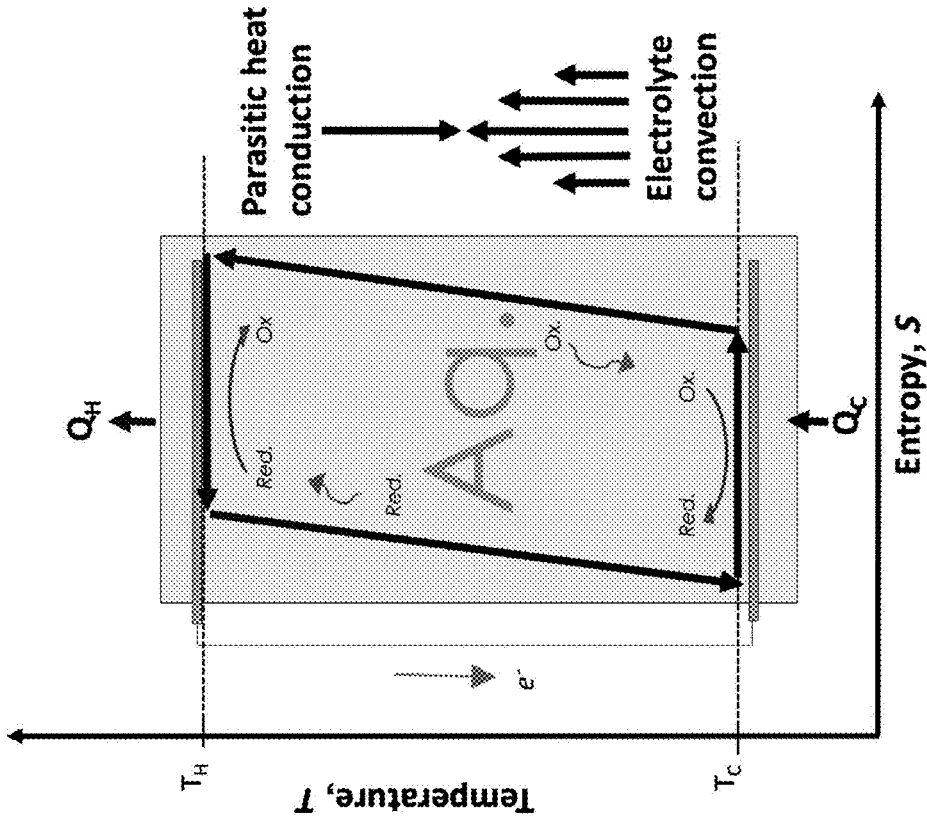
FIG. 1B is a temperature-entropy diagram of an idealized redox refrigerator, where forced advection of joule-heated electrolyte away from the cooling junction in the redox refrigerator reduces parasitic heat losses, enabling higher cooling power than the Peltier cooler.
Figure 1A:
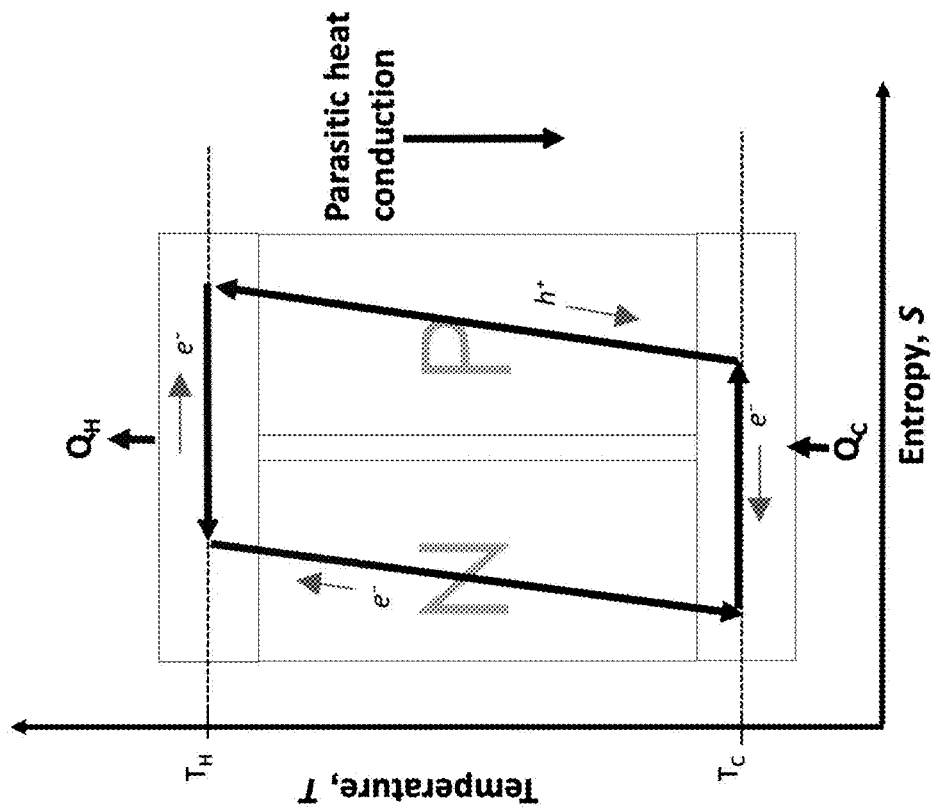
FIG. 1A is a temperature-entropy diagram of an idealized Peltier cooler.

FIG. 1A and FIG. 1B are temperature-entropy diagrams comparing an idealized Peltier cooler with an idealized redox refrigerator. In the redox refrigerator of FIG. 1B, forced advection of joule-heated electrolyte away from the cooling junction reduces parasitic heat losses, enabling higher cooling power than the Peltier cooler.

FIG. 2A is an optical view of a redox refrigerator device according to an embodiment of the invention showing the electrodes 100 and 102 and electrolyte flow channel 104 carrying electrolyte refrigerant 106. A corresponding infrared view of the device is shown in FIG. 2B where the electrode regions 108 and 110 indicate cooling due to oxidation of the refrigerant and heating due to reduction of the refrigerant, respectively. Specifically, a potential difference is applied across the two electrodes in contact with the electrochemical refrigerant flowing through the channel between them. The $Fe(CN)_6^{4-}$ refrigerant is oxidized to $Fe(CN)_6^{3-}$ at the anode, producing a cooling effect, while the opposite process occurs at the cathode, rejecting heat. An overall flow of electrolyte from the cooling to the heating electrode prevents the equilibration of the cooling electrode with either the heating electrode or the joule-heated electrolyte. In the cell, the reduction of $Fe(CN)_6^{3-}$ yields an entropy change per charge $a=\Delta S/F=-1.5$ mV/K, which corresponds to a theoretical maximum cooling power density of $i\Delta S T_c/F$ for applied current density i, Faraday's number F, and cold electrode temperature $T_c^{18}$.

The inventors have explored the effect of electrolyte convection on temperature depression and observe the cooling effect in two example device configurations. Figures of merit are provided for redox refrigerants, and a number of conventional redox active fluids from the flow battery community are evaluated as potential alternatives to the $Fe(CN)_6^{3-/4-}$ redox couple.

Three time scales govern the dynamics of the $Fe(CN)_6^{3-/4-}$ electrochemical refrigerator. Considering heat conduction, the characteristic time for transport between the electrodes is $\tau_{thermal} \approx d^2 \rho C_p/\kappa$ for inter-electrode distance d, electrolyte density ρ, thermal conductivity κ, and specific heat $C_p$. Considering heat advection, the characteristic time depends on the flow velocity v between the electrodes $\Sigma_{flow} \approx d/v$. For stagnant electrolytes, the characteristic timescale of the electrochemical response based on reactant diffusion is $\Sigma_{sand} \approx \pi D$ (0.5 $C_o$ F/$i_{initial}$) for reactant diffusivity D, concentration $C_o$, and applied current density $i_{initial}$[19]. To enable continuous cooling, the cooling electrode must be thermally isolated from both Joule heating in the electrolyte and activation losses at the hot electrode. This requires the electrolyte to flow swiftly enough so that $\tau_{flow} \ll \tau_{thermal}$. For stagnant electrolyte, the duration that cooling can be maintained is expected to be the shorter of $\tau_{thermal}$ and $\tau_{sand}$.

An infrared microscope (Quantum Focus Instruments, InSb detector) was used to visualize the thermal effects of $Fe(CN)_6^{3-/4-}$ reduction/oxidation in a custom-made electrochemical flow cell, depicted in FIG. 2B. Carbon paper electrodes (SpectraCarb 2050a) were oxidized in air at 200° C. for hydrophilicity and deposited on an infrared-transparent $CaF_2$ substrate (ThorLabs). The electrodes were positioned in the flow path of an aqueous 350 mM $K_3Fe(CN)_6^{3-}$|350 mM $K_3Fe(CN)_6^{4-}$ solution. The electrolyte flow was controlled using a peristaltic pump (Masterflex) and preheated to 50° C. before entering the cell by flowing through a parylene-coated serpentine channel milled into a heated Al block. In addition to heating the sample above the ambient temperature for better infrared signal above room-temperature thermal reflections, this heating allowed the emissivity for each point within the sample to be calibrated. The single-temperature emissivity measurement is made possible by a correlation between one- and two-temperature radiance measurements for a library of materials implemented by the Quantum Focus microscope. The single-point resolution for this approach is 100 mK, with sensitivity down to 1 µK claimed for spatially averaged measurements. Electrolyte flow velocity was estimated by measuring the volumetric flow rate and correcting for the cross-sectional area of the flow channel housing the electrodes. Contact to the electrodes 100 and 102 was established using strips of 12.5 µm Ti foil (GalliumSource) 112, 114, 116, 118, as shown in FIG. 2A.

The electrochemical redox of $Fe(CN)_6^{3-/4-}$ was driven and monitored potentiostatically (Biologic SP-240). Since the opposite electrochemical reactions were run at the oxidation (cooling) and reduction (heating) electrodes, the open-circuit voltage of the cell was 0 V and so the applied voltage is reported as the total overpotential for both reactions $\eta = \eta_{red} + \eta_{ox}$. No reference electrode was used.

The temperature depression was measured by integrating the temperature signal over the area of the cooling electrode on the infrared movie that was created from each test run. The total cooling power was estimated using an aggregate heat transfer coefficient, U [W/K], between the electrode and its surroundings. To establish U, a known electrical current was driven across the cooling electrode to use it as a Joule heater with known power dissipation P. By monitoring the resulting electrode temperature rise ΔT at each flow setting, the constant of proportionality U=ΔT/P could be inferred. The U measured for each flow rate was then used to estimate the cooling power based on the observed ΔT during the cooling experiments.

For stagnant electrolyte tests, both electrodes were loaded with a high activity and high surface area catalyst, which was intended to both decrease activation losses and to increase the emissivity of the electrode for better temperature estimation. The Pt—C catalyst ink consisting of 50 µg/µL HISPEC 40% Pt on high surface area carbon in 3:2:0.1 $H_2O$ (MilliQ Synergy UV): Isopropanol (Aldrich): Nafion 117 dispersion (Aldrich) was dropcast onto the positive electrodes for a total Pt loading of 0.5 mg/cm². For test with flowing electrolytes, no catalyst coating was used to improve electrode consistency over lengthy tests. Electrode spacing d was also increased from approximately 0.5 mm in the stagnant test to 1.0 mm in the tests with flow.

Figure 3:
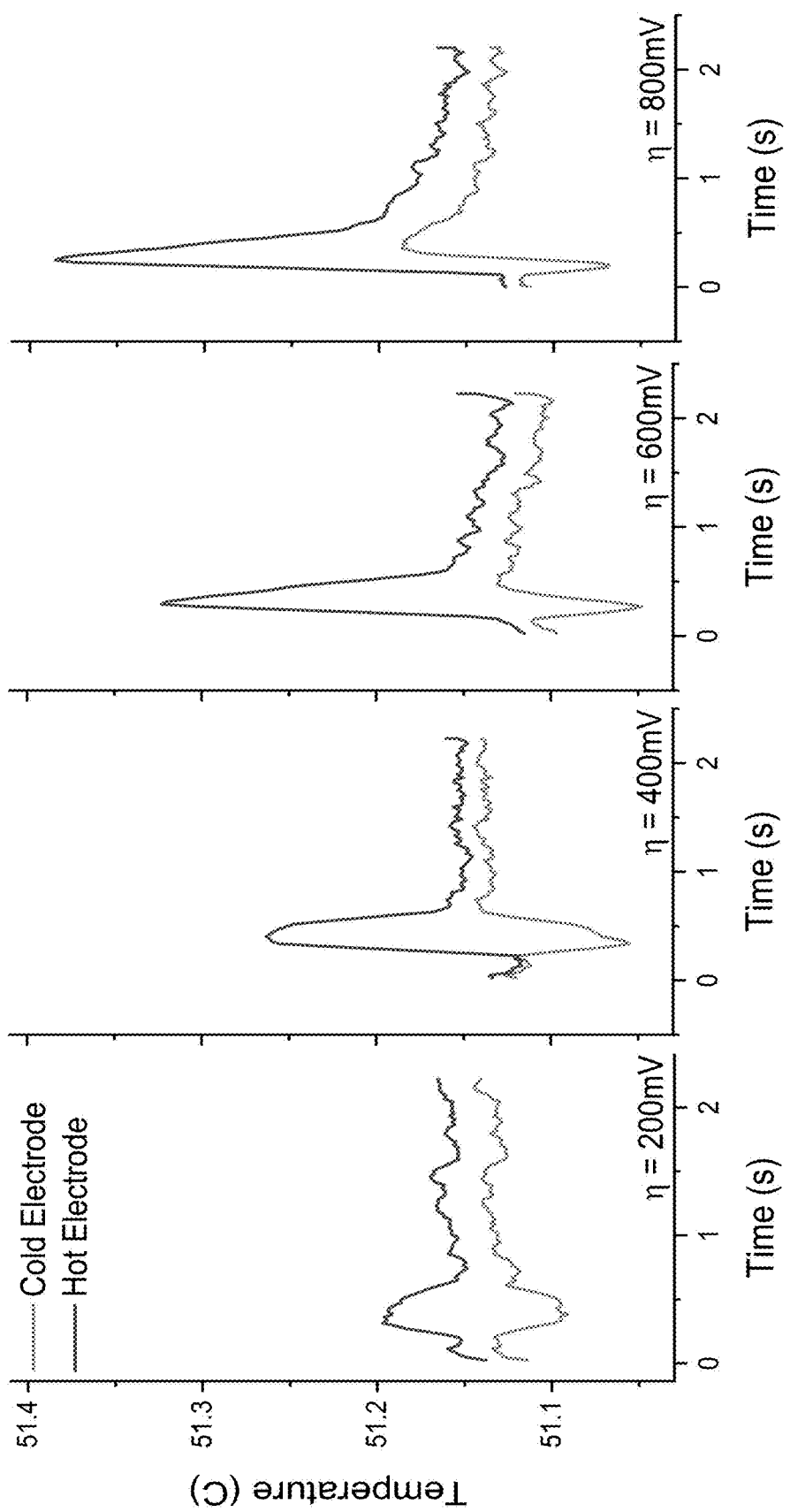
FIG. 3 shows graphs of temperature response of anode (cold electrode) and cathode (hot electrode) upon application of various overpotentials in stagnant electrolyte. For this configuration $\tau_{sand} \approx 0.3$ s, while $\tau_{thermal} \approx 1.4$ s, so it is likely that the cooling pulse duration was limited more by ion concentration polarization than by thermal equilibration between the electrodes.
Figure 7:
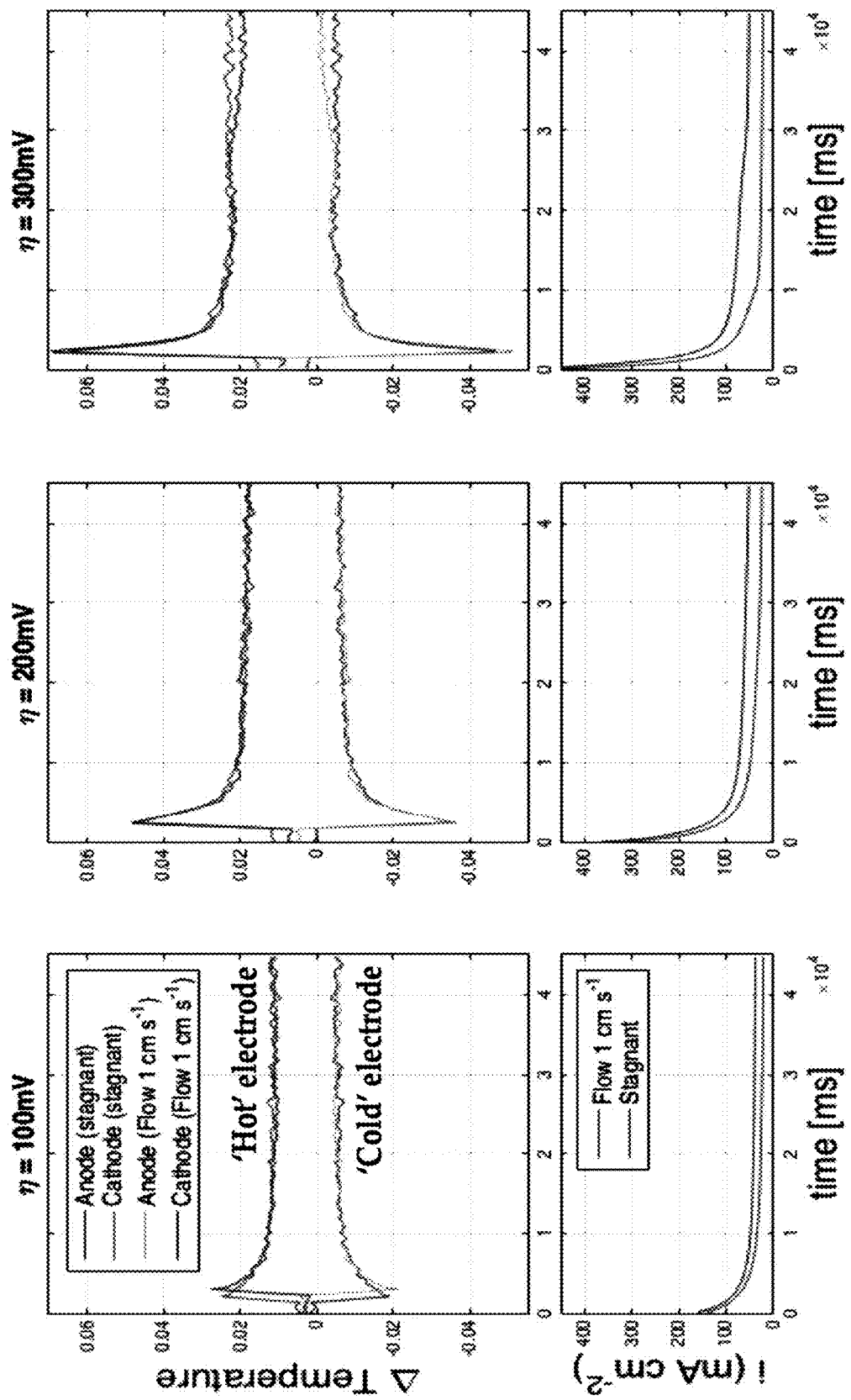
FIG. 7 shows temperature profiles related to current density with and without electrolyte flow. Additional cooling power as a result of higher current is exactly compensated by higher heat removal by electrolyte.

Initial testing was performed in stagnant electrolyte to test the electrochemical and thermal behavior in the absence of flow. The thermal response of both electrodes to 2 seconds of applied voltage is shown in FIG. 3. As expected, the anode experiences a momentary temperature decrease, and the cathode experiences a concomitant increase. Both temperature deviations are of shorter duration than the applied voltage pulse. While the short duration of cooling could be due to either thermal equilibration in the small gap between or the decreasing reaction current over time due to concentration polarization of the electrolyte (see FIG. 7), concentration polarization is likely the larger contributor in this case because $\tau_{sand} \ll \tau_{thermal}$. As larger driving potentials are applied, the magnitude of the heating effect at the cathode grows faster than the cooling effect at the anode, as expected for less reversible heat pump operation. At very high overpotential, the cooling effect at the anode is overwhelmed by heating due to activation and transport losses even before $\tau_{sand}$, and long before heat can propagate across the interelectrode space.

Figure 4:
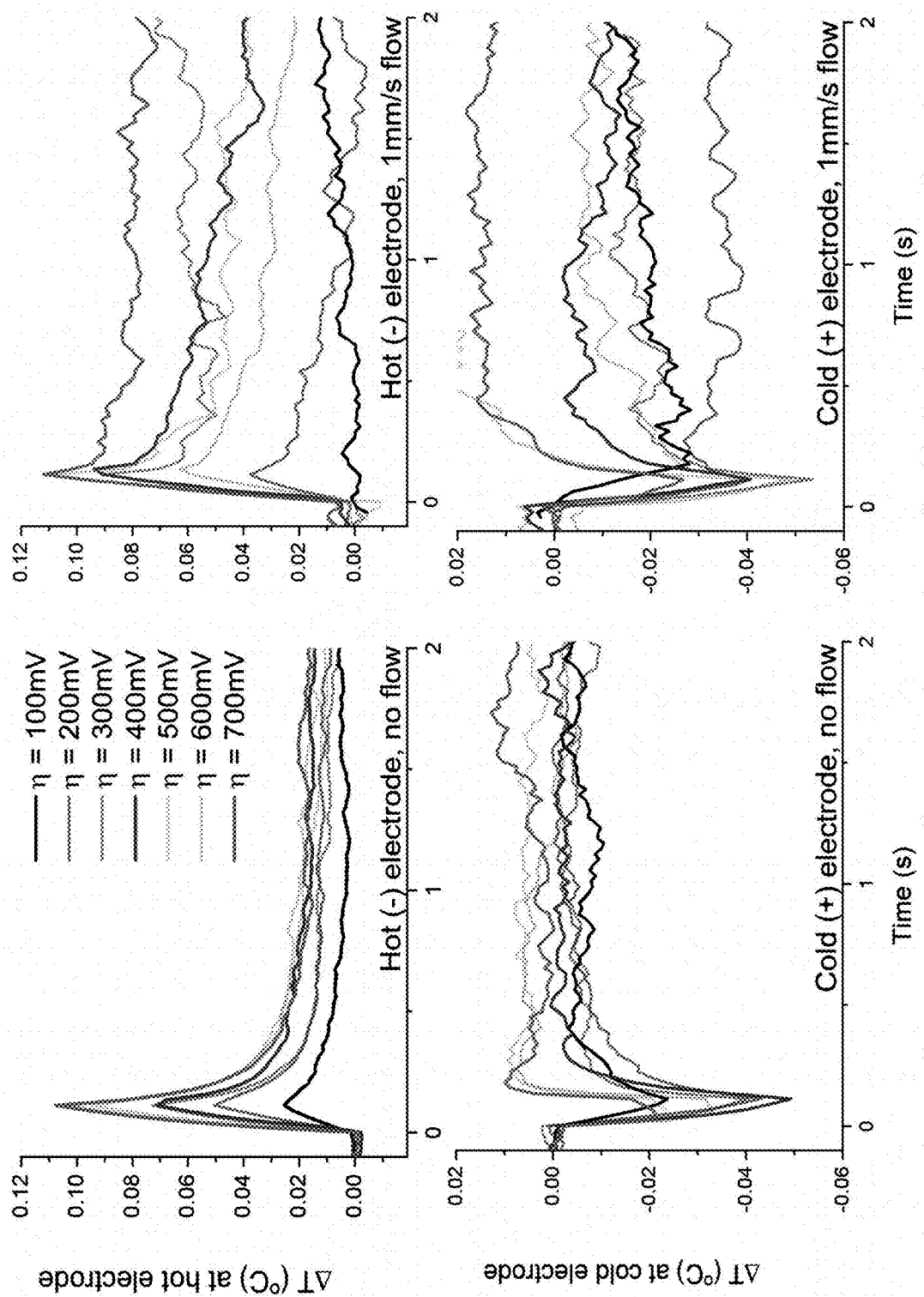
FIG. 4 shows graphs of temperature response of cold electrode (bottom) and hot electrode (top) upon application of various overpotentials in both stagnant (left panels) and flowing (right panels) electrolyte. Flowing electrolyte enables continuous cooling operation, but it does not significantly change the measured temperature depression.

As shown in FIG. 4, electrolyte flow dramatically altered the thermal response of the cell. In these tests, different overpotentials were applied and the temperature response monitored with and without electrolyte flow. The applied current and overpotential were also recorded and was used to compare the estimated to the theoretical cooling power. Both peak and maximum steady-state cooling were achieved at higher overpotential with flowing electrolyte than with stagnant electrolyte. Flowing electrolyte also allowed for some steady-state refrigeration (albeit delivered at lower η than the peak value), which was neither expected nor observed in the cell with stagnant electrolyte. However, the magnitude of the peak cooling was not significantly larger with flow than without.

The similarity of the peak cooling values for stagnant and flowing electrolyte are attributable to the scaling of both i and U with $v^{1/2}$. In other words, higher flow rates allow for higher cooling power by advection of reactant towards (and Joule heating away from) the cooling electrode but simultaneously allow better heat removal from the cooling electrode. Therefore, electrolyte flow does not appreciably change the transient ΔT.

Figure 5:
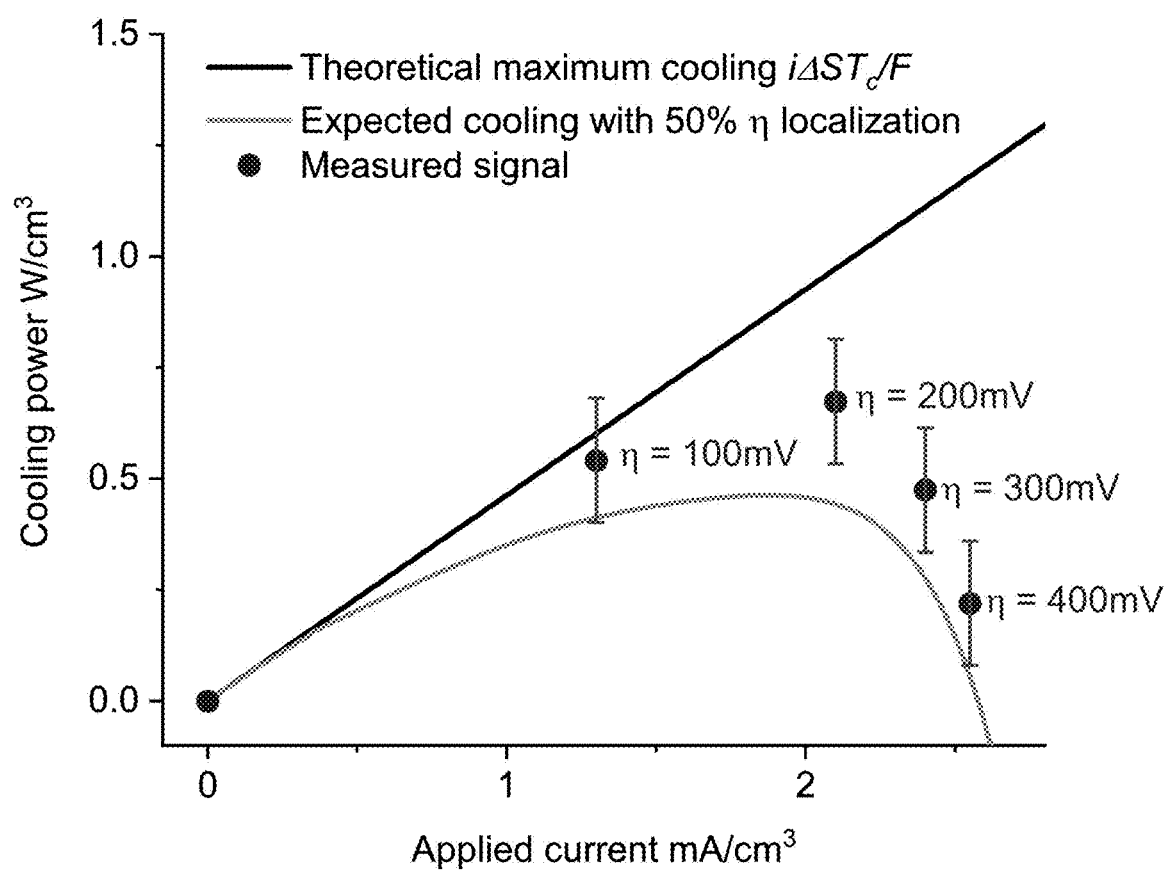
FIG. 5 is a graph of estimated volumetric cooling power at different driving currents with 1 mm/s electrolyte flow, compared to theoretically achievable cooling power with no losses (black) and with measured irreversibility evenly split between the two electrodes (grey). The solid lines are calculated based on i and η input to the cell, while individual points are based on the thermal signal at the IR microscope. Electrolyte flow from the cold to the hot electrodes allows less than 50% of kinetic losses in the cell to manifest as a temperature rise on the cooling electrode, enabling a more powerful refrigeration effect than would be possible in a cell with stagnant electrolyte.

Comparison of the estimated and theoretical cooling power with electrolyte flow illustrates a similar dynamic. As shown in FIG. 5, electrolyte flow allows for favorable partitioning of the temperature rise due to the cell's irreversibility; less than 50% of the total overpotential applied to the cell results in undesired temperature rise at the cooling electrode. For a typical Butler-Volmer transfer coefficient $a_{b-v} \approx 0.5$, the expectation in stagnant electrolyte is that approximately 50% of the applied activation overpotential will manifest as an undesirable temperature increase on the cooling electrode. The anticipated cooling in this case is described by the grey curve in FIG. 5. That the measured cooling power was higher than this power indicates the benefit of electrolyte flow in sweeping joule heated electrolyte away from the cooling junction. This effect diminished and the total kinetic losses regressed towards an equal partition at higher currents, as concentration polarization rather than ohmic losses in the electrolyte become dominant[19]. While the observed partitioning of overpotential losses onto the heating electrode could in theory be due to a kinetic asymmetry in the reaction, (i.e. a Butler-Volmer transfer coefficient $a_{b-v} \neq 0.5$), this asymmetry would not continue to scale with higher applied overpotentials, and is inconsistent with prior measurements of $a_{b-v}$ for Fe$(CN)_6^{3-/4-}$ kinetics[20].

The inventors envision alternative embodiments that include several variations to achieve a greater cooling effect, which were not included in these experiments described above for simplicity and ease of visualizing results. These include tighter electrode spacing for lower total ohmic losses[22], a supporting electrolyte for greater ionic conductivity[19], flow-through rather than flow-past electrode configurations, high surface-area catalyst loading, and a co-solvent for the electrochemical refrigerant mixture. Species other than Fe$(CN)_6^{3-/4-}$ might also be used as electrochemical refrigerants. These might include redox of species containing Fe, I, Br, Ce, Cr, H, or S in aqueous, non-aqueous, or mixed solvent systems. Additionally, pairs of redox refrigerants might be used. In a pair of cells connected by a membrane (such as in [11]), this configuration can allow two redox cooling processes to occur at one heat transfer location, and two redox heating processes to occur at another location. Additionally, the use of a pair of refrigerants allows for simultaneous refrigeration and energy storage. For example, in a connected cell of $V^{4+/5+}$ and $V^{2+/3+}$, both reactions can be driven in the negative entropy direction at a pair of cooling electrodes, storing energy. At a later time, the two processes can be run in the positive entropy direction, both releasing stored electrical energy and creating a redox heating effect.

Alternative flow arrangements could also enable effective redox refrigeration from a single pair of electrodes. In the multi-stage refrigerator embodiment of FIG. 8, electrolyte flow is largely orthogonal to the inter-electrode direction, with only a component of the electrolyte flow aligned with the inter-electrode direction. Electrolyte flow completely transverse to the line connecting the heating and cooling electrodes would also result in effective refrigeration. In this case, electrolyte flow from the cooling electrode to a third point 3 would undergo temperature decrease, and could be run through a cold-side heat exchanger or directed to an additional electrochemical refrigeration cell. Electrolyte flow from the heating electrode to a fourth point 4 could be run through a hot-side heat exchanger, and optionally recirculated back to the cell's electrolyte inlet.

In another useful embodiment of a redox refrigerator, the refrigerant species could be included directly in the electrolyte of a conventional battery system. For example, a redox refrigerant with $\alpha<0$ and standard reduction potential slightly above the ordinary discharging potential of a battery's negative electrode could be included in the battery's electrolyte, to provide both an additional electron sink and a right-on-time cooling pulse when the battery's voltage dropped (and therefore its negative electrode transited the refrigerant's equilibrium potential) during maximum load conditions. This would result in a useful self-cooling effect for batteries, which are often limited by overheating when providing maximum power.

In addition, the inventors envision embodiments that include flow-through rather than flow-past electrode configuration, a multi-stage design (one possible implementation of which is described below in relation to FIG. 8), and a much higher flow rate to eliminate concentration polarization on the cooling electrode. The relatively slow flow rates described in the examples above reflect the goal of elucidating the effect of flow for purposes of illustration here, rather than leading to the maximum possible cooling power. Thus, the inventors envision considerably higher flow rates in commercial implementations.

The flow-past electrode configuration was similarly chosen to facilitate lower-noise IR thermography. Drawing on extensive work in the flow battery community the inventors envision that a flow-through configuration would in fact better reduce concentration polarization[23]. Additionally, while thermodynamic calculations indicate that cooling can be achieved up until a product/reactant concentration $C_{oxidized}/C_{reduced}=e^{-aF/R}$, the use of a reference electrode could aid in localizing overpotential and thus in formulating the ideal ratio of reduced and oxidize species in the refrigerant. The inventors thus envision embodiments that take advantage of such improvements.

Materials design is an important aspect of optimizing electrochemical refrigeration systems such as this. While the Fe$(CN)_6^{3-/4-}$ redox couple was chosen in the examples discussed above based on its track record of use in thermogalvanic systems, the inventors recognize that there is a wide parameter space open for electrochemical refrigerants with the right combination of high standard entropies of reduction $\Delta S$, low activation barrier $E_a$ for reduction (if a>0) or oxidation (if a<0), low specific heat $c_p$, and a high capacity of entropy carriers C (in mol/kg), which equates to high total solubility for aqueous species. These properties are the primary determinants of the achievable cooling effect $\Delta T_{real}$ in a system in which heating due to concentration polarization and ohmic losses in the electrolyte are managed by forced convection.

We define $$\Delta T_{real} = \frac{\left(\Delta S\left(\frac{J}{\text{mol } K}\right) T(K) - E_a\left(\frac{J}{\text{mol}}\right)\right) \times C\left(\frac{\text{mol}}{\text{kg}}\right)}{c_p\left(\frac{J}{\text{kg } K}\right)}$$

Based on a Buckingham Pi analysis, we propose the following dimensionless figures of merit for electrochemical refrigerants:

$$Y = \frac{\Delta S\left(\frac{J}{\text{mol } K}\right) C\left(\frac{\text{mol}}{\text{kg}}\right)}{c_p\left(\frac{J}{\text{kg } K}\right)}$$

and $$Q_{g/b} = \frac{\Delta S\left(\frac{J}{\text{mol } K}\right) T(K)}{E_a\left(\frac{J}{\text{mol}}\right)}$$

where Y gives the ratio of redox cooling potential to sensible heat energy stored in the refrigerant, and is also described in the literature on electrochemical energy harvesting[10]. Y expresses the thermodynamic reality; $YT=\Delta T_{max}$ the maximum cooling that could be achieved adiabatically by this refrigerant given totally reversible operation and a very long residence time near the electrode surface (or in a staged design). By contrast, $Q_{g/b}$ expresses the kinetic reality as the ratio between the "good" and "bad" thermal signatures per carrier; only refrigerants with $Q_{g/b}>1$ can demonstrate a cooling effect in practice.

Redox reaction entropy is generally attributed to rearrangements of molecular structure and solvation[24]. Marcus theory, however, correctly predicts that large molecular and solvation rearrangements disfavor electron transfer[19]. As a result, one might expect a fundamental tradeoff between reversibility and reaction entropy that limits Q. Due to solvent effects in particular, larger dissolved molecules should demonstrate generally lower $E_a$ and $\Delta S$, whereas smaller molecules should demonstrate higher $\Delta S$ and $E_a$. In this respect, a "happy medium" for $Q_{g/b}$ might be hard to find. Fortunately, despite these countervailing factors a number of aqueous dissolved species can be identified with $Q_{g/b} > 1$. Table 1 provides several examples of such species.

TABLE 1

Properties of potential redox refrigerants. $Q_{g/b}$ and $YT = \Delta T_{max}$ are listed to illustrate the trade-off between overall cooling capacity, reversibility, and thermopower. Properties of reduction reactions denoted '*' were measured expressly for this work, as described in the SI. Entropy of reduction varies with total concentration for some species. In these cases, $\Delta T_{max}$ and $Q_{g/b}$ were calculated based on the concentration yielding the highest $\Delta T_{max}$. Activation energies $E_a$ were estimated based on literature sources for exchange current density or reaction velocity, as described in the SI.

| Redox reaction | $\Delta a$, mV/K | $YT = \Delta T_{max}$ @ 300K, K | $Q_{g/b}$ @ 300K |
|---|---|---|---|
| $2H^+ + 2e^- \to H_2$ (g) | 0.8 | 307 | $4.0^{8,26}$ |
| $V^{3+} + e^- \to V^{2+}$ | 1.2-1.9* | 36 | $6.0^{27}$ |
| $V^{5+} + e^- \to V^{4+}$ | −0.2* | 6 | $2.4^{27}$ |
| $Br_2(l) + e^- \to 2Br^-$ | 0.3* | 14 | $1.7^{28}$ |
| $Fe(CN)_6^{3-} + e^- \to Fe(CN)_6^{4-}$ | −1.5* | 10.6 | $78.4^{29}$ |
| $Fe^{3+} + e^- \to Fe^{2+}$ | 1.1* | 36 | $95.7^{30}$ |
| $Cr^{3+} + e^- \to Cr^{2+}$ | 2.2 | 7 | $219.5^{8,23,30}$ |
| $Ce^{4+} + e^- \to Ce^{5+}$ | 2.3 | 13 | $36.0^{8,31}$ |
| $S_2^{2-} + 2e^- \to 2S^{2-}$ | −.7 | 9.4 | $1.3^{8,32}$ |

Table 1 illustrates a different tradeoff. Pure substances such as water require no solvent by definition, and so have high Y ratios and correspondingly high $\Delta T_{max}$ relative the species' thermopower. However, redox of these small molecules requires inner-sphere electron transfer, which tends to proceed slowly[19], leading to a poor ratio Q. By contrast, many coordinated metal species are only moderately soluble, and the c, contribution of the excess solvent is reflected in low $\Delta T_{max}$. However, these species undergo comparatively fast single-electron transfer and frequently have high $\Delta S$ leading to high $Q_{g/b}$. An important step in the future will be to identify the trick that allows an electrochemical refrigerant to circumvent this apparent tradeoff.

Many promising potential electrochemical refrigerants have already been studied by the redox flow battery community, which has spent decades screening electroactive species for solubility, stability and reversibility[23]. Further inspiration can be found in the strikingly similar set of compounds found in biological vascular systems. Hemovanadin (vanadium), hemoerythrin, chlorocruorin and hemoglobin (iron) and hemocyanins (copper) all point to the enormously tunable redox properties of an appropriately coordinated metal center[25]. Laboratory results suggest that the standard entropy of reduction is perhaps as tunable as the redox potential[24]. The inexhaustive list of Table 1 contains only a few potential liquid-phase refrigerants and completely omits other electrochemical transformations (solid dissolution, hydriding, intercalation, redox of slurries, in non-aqueous media etc.) that may be of great interest in future work.

Calculating $Q_{g/b}$ and $\Delta T_{max}$ for a Variety of Redox Couples

The specific heat $c_p$ and density $\rho$ of the $V^{2+/3+}$ and $Fe(CN)_6^{3-/4-}$ solutions and the thermopower a of the $V^{2+/2+}$, $V^{4+/5+}$, $Fe(CN)_6^{3-/4-}$, $Fe^{2+/3+}$ and $Br_2/Br^-$ redox couples were measured as described in [Poletayev, et al. Continuous electrochemical heat engines. Energy Environ. Sci. 11, 2964-2971 (2018)]. For dissolved redox couples other than $V^{2+/3+}$ and $Fe(CN)_6^{3-/4-}$, $c_p$ and $\rho$ were used for NaCl solutions of the same total ionic strength. For redox couples other than $V^{2+/3+}$, $V^{4+/5+}$, $Fe(CN)_6^{3-/4-}$, $Fe^{2+/3+}$ and $Br_2/Br^-$, a was taken from calculations based on formation values [Bratsch, S. G. Standard Electrode Potentials and Temperature Coefficients in Water at 298.15K. J. Phys. Chem. Ref. Data 18, 1-21 (1989)].

The activation loss $E_a$ was estimated based on literature sources for rotating disc electrode measurements of exchange current density $i_o$ or reaction velocity $k_o$. Since $i_o$ and $k_o$ were generally not available at multiple temperatures as is required to establish a traditional activation energy, $E_a$ was instead approximated via the Butler-Volmer relation as the overpotential applied to pass 1 mA/cm² for the reduction (if a>0) or oxidation process (if a<0). Since a variety of $i_o$ values have been reported for each redox system common middle-of-the-road values were chosen. Higher values can be found for each couple, generally on noble metal catalysts. Significantly lower values can also be found reported as reaction velocities on Hg and Au, generally from older studies [Weber, A. Z. et al. Redox flow batteries: A review. J. Appl. Electrochem. 41, 1137-1164 (2011)]. Notably, reaction velocities reported at low reactant concentrations were often inconsistent with exchange current densities established at higher concentrations. Where such discrepancies existed, the more frequently reported value was used.

Figures 6A, 6B:
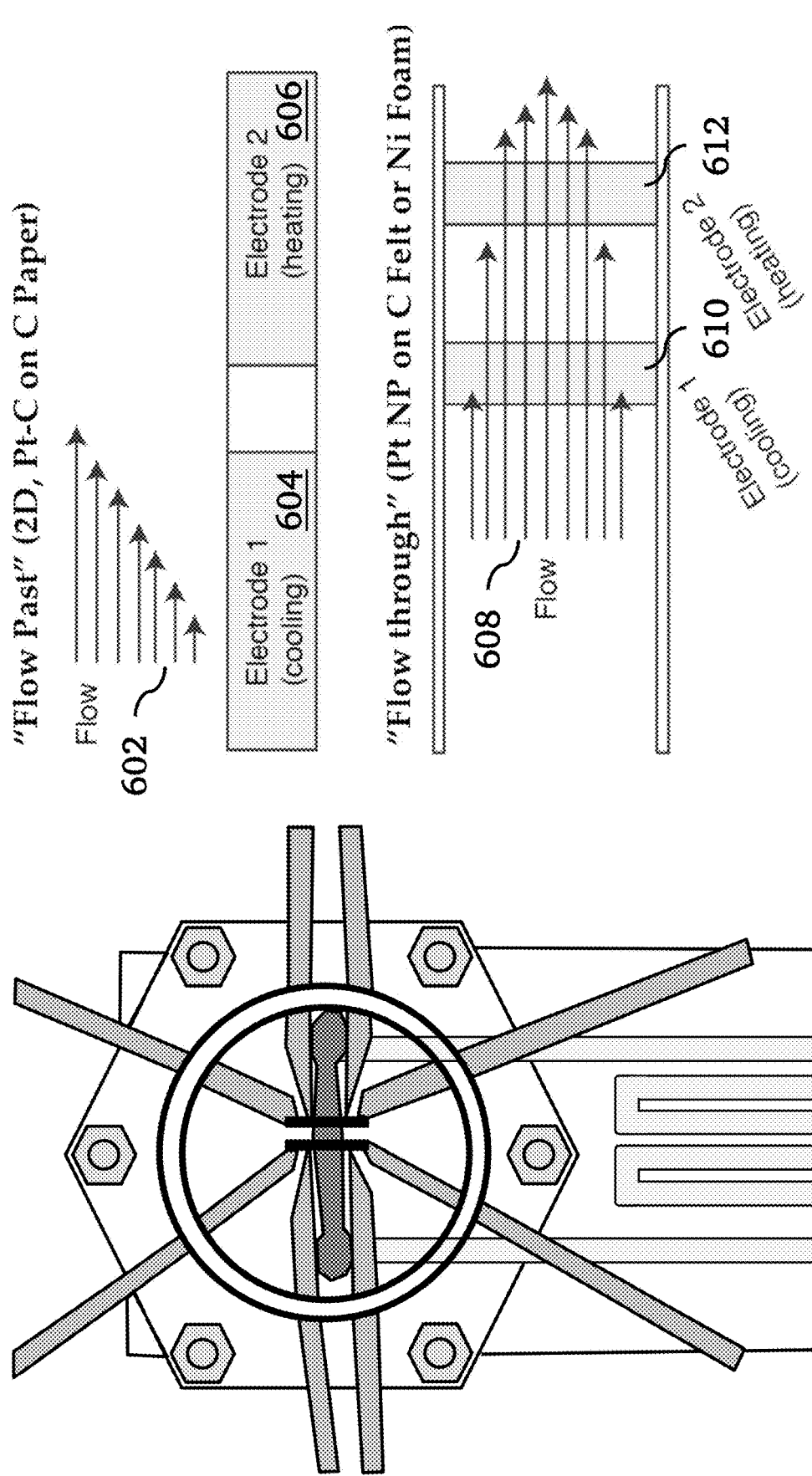
FIG. 6A is a photograph of a flow cell geometry of a redox refrigeration device according to the invention.
FIG. 6B is a schematic comparison of flow-through and flow-past electrode configurations.

FIG. 6A is a photograph of a flow cell geometry of a redox refrigeration device with a built-in serpentine pre-heating channel 600. The device is otherwise similar to the device shown in FIG. 2A. A schematic comparison of flow-through (bottom) and flow-past (top) electrode configurations is shown in FIG. 6B. In the flow-past configuration, the refrigerant 602 flows across the surface of the cooling and heating electrodes 604 and 606, respectively, while in the flow-through configuration, the refrigerant 608 flows across the surface of the cooling and heating electrodes 610 and 612, respectively.

Figure 8:
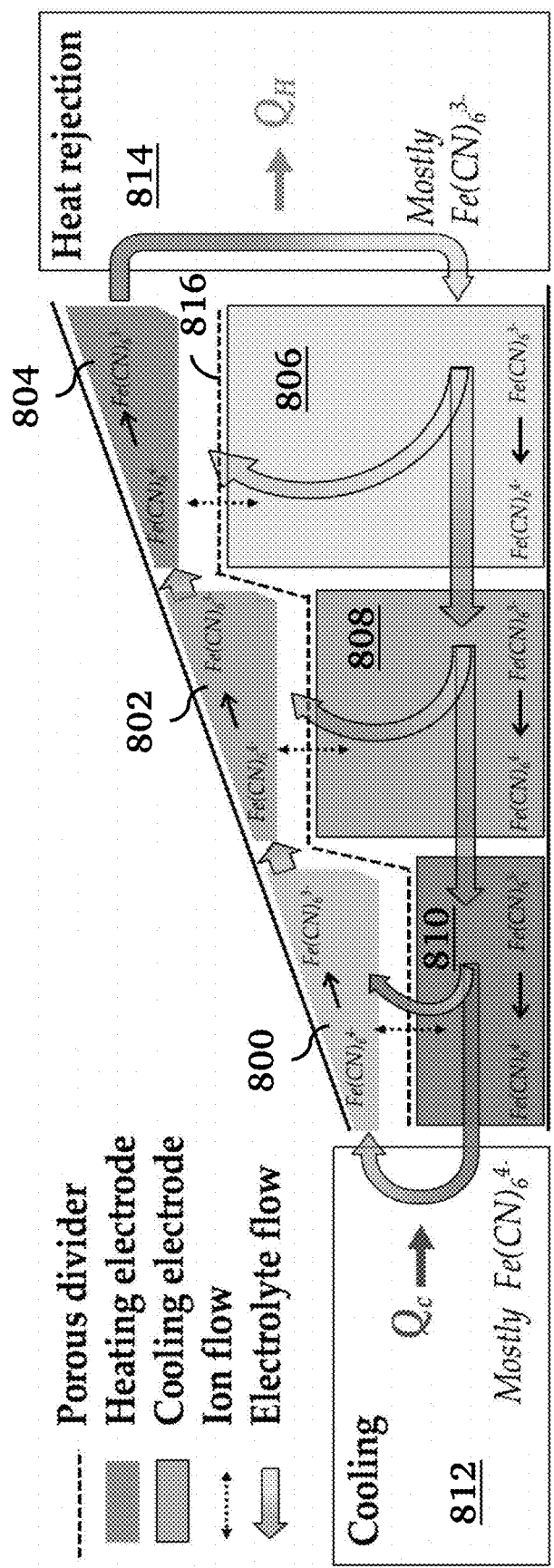
FIG. 8 illustrates a multi-stage design of a redox refrigerator with tapered flow-through electrodes for large $\Delta T$, high cooling power density. Flow pushes joule-heated electrolyte away from cooling junctions.

FIG. 8 illustrates a multi-stage embodiment of a redox refrigerator with three tapered flow-through electrodes 800, 802, 804 for large $\Delta T$, high cooling power density. Flow pushes joule-heated electrolyte away from cooling junctions 806, 808, 810. Cold plate 812 receives cold flow from electrode 810 and the flow then recirculates to electrode 800. Hot plate 814 receives warm flow from electrode 804 and the cooled flow then enters cooling stages at electrode 806. This embodiment illustrates decoupling of thermal and ionic transport lengths. The cooling electrodes 806, 808, 810 are separated by the heating electrodes 800, 802, 804 by a porous divider 816. This embodiment depicts one of many configurations in which multiple electrode pairs are combined to create a larger temperature difference than was realized experimentally with the single pair of electrode embodiments described earlier.

FIG. 9 shows SEM images of the porous cooling electrodes as prepared. They are composed of platinum catalyst bound to carbon paper using a sulfonated fluoropolymer binder.

In conclusion, an electrochemical refrigerator based on a redox couple (e.g., the $Fe(CN)_6^{3-/4-}$ redox couple) is described and implemented. While refrigeration systems have been demonstrated previously that leverage electrochemical driving forces to drive other phase transitions[13], to our knowledge this is the first practical realization of a refrigeration cycle based on the entropy changes inherent in electrochemical redox reactions. The examples described herein focus on electrode configurations with and without electrolyte flow. Although the high entropy change of $Fe(CN)_6^{3-/4-}$ redox and the ability to flow the joule-heated electrolyte away from the cooling junction enabled high power densities when normalized to the tiny volume of the cooling electrodes, these high power densities did not translate to either large temperature differences or efficient refrigeration. We found that, at least for this redox couple in this configuration, the benefit of electrolyte flow cannot compensate for the high reaction activation energy and low electrolyte conductivity relative to solid-state thermoelectric devices.

A key advantage of the electrochemical approach over other alternative approaches to refrigeration is that it offers the unique opportunity to leverage the vast knowledge and progress in the area of electrochemical storage (e.g., batteries) and to use it in a novel way for the purpose of cooling. Using the teachings of the present invention, electrochemical refrigeration may prove to have great benefits for $21^{st}$-century climate control and other applications.

REFERENCES

1. *Annual Energy Outlook* 2019. 83 (U.S. Energy Information Administration, 2019).
2. *World Population Prospects, 2017 Revision: Key Findings and Advance Tables*. (United Nations Population Division, 2017).
3. Velders, G. J. M., Fahey, D. W., Daniel, J. S., McFarland, M. & Andersen, S. O. The large contribution of projected HFC emissions to future climate forcing. *Proc. Natl. Acad. Sci. U.S.A* 106, 10949-10954 (2009).
4. *Amendment to the Montreal Protocol on Substances that Deplete the Ozone Layer*. (United Nations, 2016).
5. Lide, D. *Handbook of Chemistry and Physics*. (CRC Press, 2012).
6. Kitanovski, A., Plaznik, U., Tomc, U. & Poredoš, A. Present and future caloric refrigeration and heat-pump technologies. *Int. J. Refrig.* 57, 288-298 (2015).
7. Brown, D., Fernandez, N., Dirks, J. & Stout, T. *The Prospects of Alternatives to Vapor Compression Technology for Space Cooling and Food Refrigeration Applications*. (2010).
8. Bratsch, S. G. Standard Electrode Potentials and Temperature Coefficients in Water at 298.15K. *J. Phys. Chem. Ref. Data* 18, 1-21 (1989).
9. Vernon, C. F. Thermogalvanic conversion of heat. 36, 63-72 (1986).
10. Lee, S. W. et al. An electrochemical system for efficiently harvesting low-grade heat energy. *Nat. Commun.* 5, 3942-3942 (2014).
11. Poletayev, A. D., McKay, I. S., Chueh, W. C. & Majumdar, A. Continuous electrochemical heat engines. *Energy Environ. Sci.* 11, 2964-2971 (2018).
12. Cole, T. Thermoelectric energy conversion with solid electrolytes. *Science* 221, 915-920 (1983).
13. Bahar, B. et al. An overview of advancements in electrochemical compressor driven heat pump systems. 10 (2017).
14. Yeo, R. S. A Hydrogen-Bromine Cell for Energy Storage Applications. 549-555 (1979).
15. Gerlach, D. W. & Newell, T. a. An Investigation of Electrochemical Methods for Refrigeration. 61801, (2004).
16. Miner, A., Majumdar, A. & Ghoshal, U. Thermoelectromechanical refrigeration based on transient thermoelectric effects. 4
17. Hu, R. et al. Harvesting waste thermal energy using a carbon-nanotube-based thermo-electrochemical cell. *Nano Lett.* 10, 838-846 (2010).
18. Salazar, P. F., Kumar, S. & Cola, B. A. Design and optimization of thermo-electrochemical cells. *J. Appl. Electrochem.* 44, 325-336 (2014).
19. Bard, A. J. & Faulkner, L. R. *Electrochemical methods: fundamentals and applications*. (Wiley, 2001).
20. Angell, D. The kinetics of the ferrous/ferric and ferro/ferricyanide reactions at platinum and gold electrodes Part I. Kinetics at bare-metal surfaces. *J. Electroanal. Chem.* 35, 55-72 (1972).
21. Holzwarth, A., Schmidt, H. W. & Maier, W. F. Detection of catalytic activity in combinatorial libraries of heterogeneous catalysts by IR thermography. *Angew. Chem.—Int. Ed.* 37, 2644-2647 (1998).
22. Gerlach, D. W. & Newell, T. A. Basic modelling of direct electrochemical cooling. *Int. J. Energy Res.* 31, 439-454 (2007).
23. Weber, A. Z. et al. Redox flow batteries: A review. *J. Appl. Electrochem.* 41, 1137-1164 (2011).
24. Hupp, J. T. & Weaver, M. J. Solvent, Ligand, and Ionic Charge Effects on Reaction Entropies for Simple Transition-Metal Redox Couples. *Inorg. Chem.* 3639-3644 (1984). doi:10.1021/ic00190a042
25. Jones, R. D., Summerville, D. A. & Basolo, F. Synthetic oxygen carriers related to biological systems. *Chem. Rev.* 79, 139-179 (1979).
26. Sheng, W., Gasteiger, H. a. & Shao-Horn, Y. Hydrogen Oxidation and Evolution Reaction Kinetics on Platinum: Acid vs Alkaline Electrolytes. *J. Electrochem. Soc.* 157, B1529-B1529 (2010).
27. Aaron, D. et al. In Situ Kinetics Studies in All-Vanadium Redox Flow Batteries. *ECS Electrochem. Lett.* 2, A29-A31 (2013).
28. Cho, K. T. et al. High Performance Hydrogen/Bromine Redox Flow Battery for Grid-Scale Energy Storage. *J. Electrochem. Soc.* 159, A1806-A1815 (2012).
29. Viswanathan, K. & Cheh, H. Y. The Application of Pulsed Current Electrolysis to a Rotating-Disk Electrode System. 3
30. Fedkiw, P. S. A Mathematical Model for the Iron/Chromium Redox Battery. *J. Electrochem. Soc.* 131, 701 (1984).
31. Xie, Z., Liu, Q., Chang, Z. & Zhang, X. The developments and challenges of cerium half-cell in zinc-cerium redox flow battery for energy storage. *Electrochimica Acta* 90, 695-704 (2013).
32. Fan, F. Y. et al. Polysulfide Flow Batteries Enabled by Percolating Nanoscale Conductor Networks. *Nano Lett.* 14, 2210-2218 (2014).

The invention claimed is:

1. A method of electrochemical redox refrigeration comprising:
    inducing a flow of an electrochemical refrigerant within an electrochemical flow cell comprising a flow channel, a first electrode within the flow channel, a second electrode within the flow channel, and an inter-electrode space within the flow channel between the first electrode and the second electrode, wherein the electrochemical refrigerant flows sequentially through the first electrode entering one side of the first electrode and exiting an opposite side of the first electrode, across the inter-electrode space within the flow channel between the first electrode and the second electrode, and through the second electrode entering one side of the second electrode and exiting an opposite side of the second electrode; wherein the first electrode and second electrode are positioned sequentially in the flow of the electrochemical refrigerant, and wherein the first electrode and second electrode are porous to the electrochemical refrigerant; wherein the electrochemical refrigerant contains only a single redox active species;

applying an electrical potential difference between the first electrode and the second electrode, wherein the electrochemical refrigerant is oxidized at one of the first electrode and second electrode and reduced at another of the first electrode and second electrode;

wherein inducing the flow of the electrochemical refrigerant comprises controlling the flow to have a rate such that a characteristic time ($\tau_{flow}$) of heat advection between the electrodes is less than a characteristic time ($\tau_{thermal}$) of heat conduction between the electrodes, so that the first electrode is at least partially thermally isolated from Joule heating in the electrochemical refrigerant and from activation losses in the second electrode.

2. The method of claim 1 wherein the first electrode is a cooling electrode and the second electrode is a heating electrode.

3. The method of claim 1 wherein the electrochemical refrigerant is reduced at the first electrode to $Fe(CN)_6^{4-}$ and is oxidized at the second electrode to $Fe(CN)_6^{3-}$.

4. The method of claim 1 wherein inducing the flow of the electrochemical refrigerant comprises inducing a continuous flow.

5. The method of claim 1 wherein the electrochemical refrigerant has a ratio $Q_{g/b}$ represented by $$Q_{g/b} = \frac{\Delta S\left(\frac{J}{\text{mol } K}\right) T(K)}{E_a\left(\frac{J}{\text{mol}}\right)}$$

whose value is greater than 1, where T represents temperature, $\Delta S$ represents the absolute value of the standard entropy of reduction of the refrigerant, and $E_a$ represents the activation barrier for oxidation or reduction of the refrigerant.

6. The method of claim 1 wherein the electrochemical refrigerant is directed through multiple successive electrochemical refrigeration cells to produce a larger net temperature depression than in a single cell.

7. The method of claim 1 wherein the electrochemical refrigerant is used for electrical energy storage and electrochemical refrigeration.

8. The method of claim 7 further comprising inducing the flow of two electrochemical refrigerants, driving two redox reactions in a negative entropy direction at a pair of cooling electrodes to either store or release stored energy and produce a redox cooling effect, and driving the two redox reactions in a positive entropy direction to either store or release stored energy and produce a redox heating effect.

9. The method of claim 1 wherein, if the electrochemical refrigerant has a negative entropy of reduction, it undergoes oxidation at the first electrode with a cooling effect and reduction at the second electrode with a heating effect.

10. The method of claim 1 wherein, if the electrochemical refrigerant has a positive entropy of reduction, it undergoes reduction at the first electrode with a cooling effect and oxidation at the second electrode with a heating effect.

* * * * *